United States Patent
Pawlicki

[15] 3,660,215
[45] May 2, 1972

[54] DEFORMABLE FIBREGLASS REINFORCED SUPPORTING ELEMENT

[72] Inventor: Heinrich R. Pawlicki, Faha West Adrigole, Bantry, Co. Cork, Ireland

[22] Filed: Dec. 14, 1970

[21] Appl. No.: 98,206

Related U.S. Application Data

[63] Continuation of Ser. No. 740,923, June 6, 1968, abandoned.

[52] U.S. Cl. ..................................161/57, 156/181, 161/85, 161/93, 161/156, 161/157
[51] Int. Cl. ..........................................................B32b 5/12
[58] Field of Search .......................................161/55, 57–60, 161/78, 84, 85, 88–96, 98, 150, 151, 156, 157, 170, 143, 144, 141; 156/181; 117/140 R; 264/136, 257, 258, 324

[56] References Cited

UNITED STATES PATENTS

| 659,416 | 10/1900 | Perry | 161/84 X |
| 1,438,875 | 12/1922 | Taylor | 161/91 X |
| 2,514,429 | 7/1950 | Waugh | 74/232 |
| 2,836,529 | 5/1958 | Morris | 161/85 |

Primary Examiner—William A. Powell
Attorney—McGlew & Toren

[57] ABSTRACT

A supporting element comprising a first layer of a flexible grid-like structure, defining the shape of the supporting element and a second layer of a fibreglass mat, interwoven with or bonded to the first layer. One or several additional layers formed either by a grid-like structure similar to the first layer or by one or several fibreglass mats may be bonded to the first and second layers. The supporting element may be deformed into any desired configuration. Subsequently molding resin is applied to the supporting element. After hardening of the resin, the supporting element is fairly rigid and remains dimensionally stable.

3 Claims, 3 Drawing Figures

Inventor:
HEINRICH R. PAWLICKI

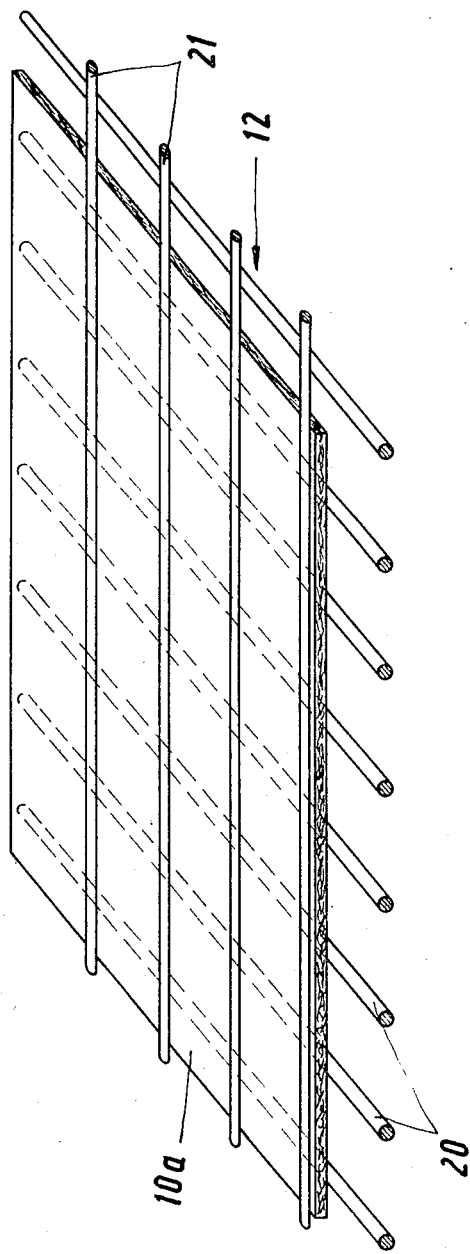

DEFORMABLE FIBREGLASS REINFORCED SUPPORTING ELEMENT

This application is a continuation of application Ser. No. 740,923, filed June 6, 1968, now abandoned.

BACKGROUND OF THE PRIOR ART

This invention refers to a deformable fiberglass reinforced supporting element, particularly for manufacturing spherically curved or dome-shaped bodies of molding resins.

According to the prior art, when manufacturing objects of fiberglass reinforced plastics, wire netting is cut to size and bent over a prepared frame having a shape corresponding to the object desired. Fiberglass mats are then laid on the shaped wire netting and a mixture of resin and hardener is applied by brushing or spraying. After hardening of the molding resin the individual layers are firmly bonded to each other. By means of this method objects of various shapes and sizes may be manufactured without using molds.

According to a further well-known method of manufacturing boat bodies or similar hollow bodies of fiberglass reinforced molding resin, strips of foamy resin may be stretched over the ribs of a model such as a model of a boat or parts thereof. Subsequently a layer of reinforced plastic material is applied to the outer surfaces. After removal of the ribs a similar layer is applied to the inner surfaces.

In the manufacture of translucent dome-shaped roofs of fiberglass reinforced polyester resins a compound consisting of two thin sheets and an intermediate polyester resin impregnated fiberglass mat may be stretched in a frame in such a manner so as to form the upper surface of a pressure-tight chamber which is located underneath the frame. When the chamber is evacuated, the fiberglass mat and the thin sheets are forced as a unit into the evacuated space. For this method no special forming tools are required.

According to still another method of the prior art, metal rods and a fabric are combined whereby the rods form a grid-like structure. This grid serves as reinforcement for the textile fabric. The manufacture of this type of reinforced fabrics is difficult, particularly if relatively small sizes are to be manufactured.

According to the well-known methods of manufacturing curved or dome-shaped bodies of reinforced molding resins, either fiberglass mats are laid on a pre-shaped wire netting and impregnated with a molding resin, or molds are utilized or, according to another of these methods, the shaping of the laminated fiberglass mats is effected by means of a vacuum. These last-mentioned methods are expensive in time and labor because either the molds or the chambers for the deep-drawing process have to be prepared and their shapes and sizes have to correspond exactly to the body intended to be manufactured. The coating of pre-shaped pieces of wire netting with fiberglass mats and the subsequent treatment of these fiberglass mats with molding resin cannot be performed in all cases encountered in practice because bodies with relatively intricate profiles or recessed surface portions can only be obtained if the fiberglass mats are attached to the carrying or supporting element which is constituted by the wire netting, thereby adapting themselves to the contours of the supporting element which has been given a shape corresponding to the body to be manufactured. This is particularly true if it is desired to manufacture curved bodies of small dimensions. The use of fiberglass mats is limited by the fact that fiberglass mats of greater thicknesses due to their inherent rigidity cannot be deformed arbitrarily.

The methods of the prior art are not suitable for manufacturing relatively big bodies such as bodies or hulls of boats and sea-going vessels. It is impracticable, for reasons of molding technics, to employ steel frames and bracings or struttings of fiberglass reinforced plastic laminates on the inside of the ship's hull, even if those frames and bracings would be required in view of the required constructional stability. It has been tried to solve these problems by providing perforated steel plates, linen fabrics, sheets or nets which are stretched over the frames and subsequently covered by fiberglass laminates. These methods, however, have not resulted in a solution which could be considered acceptable from the engineering point of view, because the laminates stay loose prior to hardening and will, therefore, not enter into a bond with their contact surfaces. Furthermore, considerable voids are inevitable, so that no compact body can be obtained.

SUMMARY OF THE INVENTION

It is the main object of the present invention to provide a fiberglass reinforced plastic laminate which already incorporates a shaping type stabilizer and which may be manufactured at low cost.

It is a further object of the present invention to provide a fiberglass reinforced constructional supporting element of the above type which, contrary to the conventional fiberglass products in the form of fabrics or mats which are soft and shapeless prior to their use, represents a novel forming material having a body which may be given any desired shape corresponding to the intended construction prior to the impregnation with molding resin.

It is a still further object of the present invention to provide a fiberglass reinforced constructional supporting element of the above type which may be used to construct intricately shaped or spherically curved bodies of any dimension and can be used as well as for steel frames and bracings in the form of panels consisting of fiberglass reinforced plastic laminates wherein the fiberglass mats and the built-in stabilizer are intimately connected with each other prior to impregnation with molding resin.

The present invention provides a deformable, fiberglass reinforced supporting element, particularly for manufacturing spherically curved bodies of molding resins, consisting of a shape-defining, flexible and inherently dimensionally stable grid-like structure comprising spotwelded metal rods made of steel or any other metal intimately interwoven with fiberglass rovings forming a cloth-like fabric whereby in every lattice-window defined by said grid-like structure a junction of warps and fills is provided, the warps and fills being arranged in such a manner that the warps are located on the one side of the grid-like structure and the fills on the other.

The grid-like structure is in the manner of textile fabric interlaced with the glass fibers which are combined into skeins. The warps and fills of the glassfabric are flexible but dimensionally stable. The grid-like stabilizing element is interwoven with the glassfibers in a textile fabric-like pattern and the glassfibers are combined into skeins whereby certain portions of the stabilizer are regularly interwoven by crossings of the glassfibers and the steel net is embedded on one side by the fills and on the other side by the warps crossing each other within the lattice-work of the steel net. Interweaving of the steel net with the fiberglass fabric is so intimate that a coherent body is formed. The same also applies to fiberglass mats which are "grafted" onto the steel net, or in other words, attached to the steel net according to a well-known method but with the aid of adhesives.

The fiberglass reinforced plastic laminates which may be deformed into any desired shape are generally utilized as a primary shape-defining laminate which serves to establish the shape of the desired object. After impregnation with molding resin and hardening of the same the structural element may be coated with additional layers of fiberglass mats or laminates until the desired thickness has been reached.

In another embodiment of the present invention the deformable grid-like structure is covered on both sides by fiberglass mats which are in the region of the lattice-windows defined by the grid-like structure mutually joined by means of an adhesive. The shape-defining stabilizing element of the invention further comprises a multitude of spaced transverse rods, covered by a fiberglass mat, the latter in turn being overlapped by mutually spaced longitudinal rods crossing the transverse rods at substantially right angles and being welded at the crossing points to the transverse rods. Additional fiberglass mats may be applied by known techniques to either surface or to both surfaces of a supporting element of this configuration.

BRIEF DESCRIPTION OF THE DRAWINGS

Some preferred embodiments of the present invention will now be described with reference to the appended drawings given merely for illustrative purposes and not considered to be limiting the invention, wherein:

FIG. 2 schematically represents a perspective view of another embodiment of the supporting element comprising longitudinal and transversal rods and an intermediate fiberglass mat.

Figure 1:
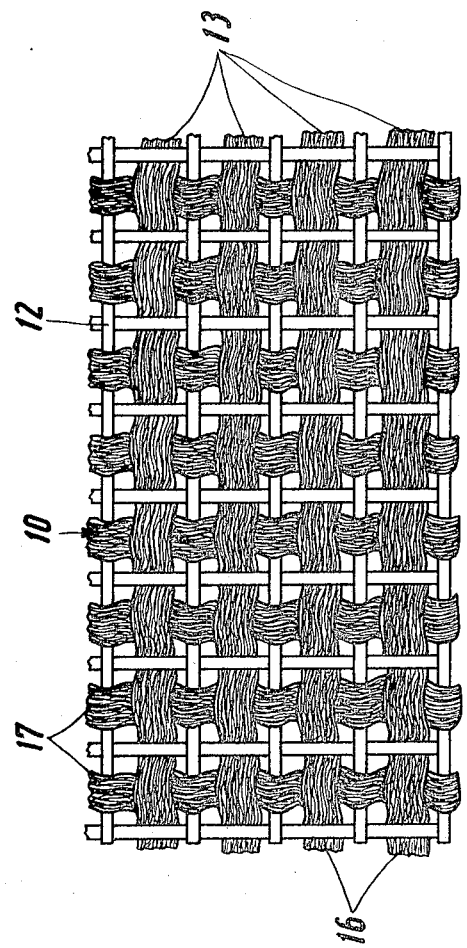
FIG. 1 schematically represents a top plan view of a first embodiment of a supporting element of the invention, comprising a steel net showing several skein-like glassfibers interwoven with the steel net in the manner of textile fabric.

In the embodiment shown in FIG. 1 of the drawings the supporting element of the invention comprises a fiberglass fabric 10 formed of separate glassfibers combined into skeins or so-called rovings 13 which are interwoven with a steel net or steel mesh 12 in the manner of textile fabric. The warps are indicated by the reference numeral 16, and the fills by the reference numeral 17. The rovings 13 are interlaced on interwoven with the grid 12 in such a manner that the warps 16 are located on the one side of the grid 12, and the fills 17 on the other, thereby embedding the steel net in the fiberglass fabric 10. By this arrangement, steel net and fiberglass fabric are intimately joined. The supporting element may be deformed or shaped into any desired configuration or spherically curved body, resulting in a dimensionally stable or rigid body. When the desired configuration has been obtained, a molding resin such as polyester resin, is applied in a well-known manner. The shaping of the supporting element of the invention may be effected without employing ribs or frames.

FIG. 2 shows another embodiment in which the grid-like structure 12 is formed of transverse rods 20 and longitudinal rods 21. The fiberglass mat 10 a is supported by the transverse rods 20, and the longitudinal rods 21 are arranged on top of the fiberglass mat 10 in such a manner that the rods 20, 21 cross each other at approximately right angles. At these crossing points, the transverse rods 20 and the longitudinal rods 21 are joined by a weld such as a spot-weld, thereby firmly attaching the fiberglass mat to he grid or steel net 12. The supporting element may be used in this form or can be coated on either or both sides with one or several fiberglass mats. In the latter case, these additional fiberglass mats will be bonded to the fiberglass mat 10a which is embedded in the grid 12 by means of welds or adhesives.

Figure 3:
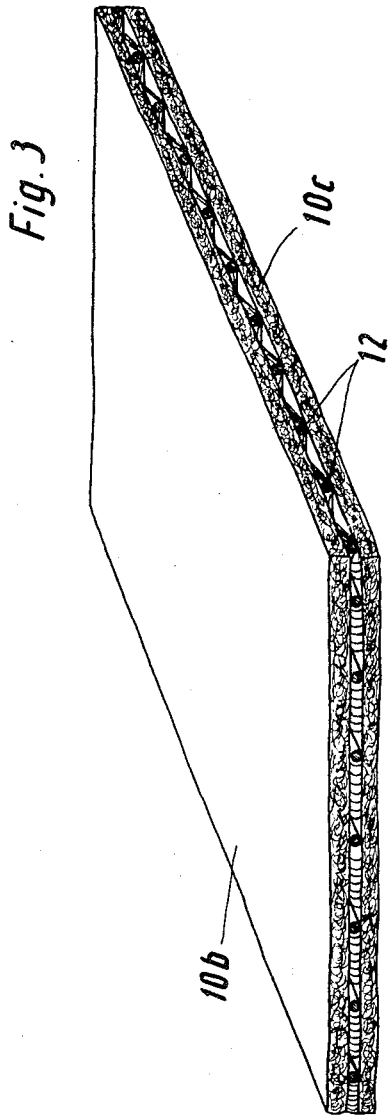
FIG. 3 schematically represents a perspective view of still another embodiment of the supporting element of the present invention, comprising a grid-like structure carrying mutually bonded fiberglass mats on both sides.

According to the further embodiment of the invention illustrated in FIG. 3 of the drawings, a deformable grid 12 may be provided between two layers of fiberglass mats 10b, 10c. In this case, the opposing parts of the mats 10b, 10c are mutually joined by welding or by means of adhesives.

When the deformable grid 12 contains relatively largely sized lattice-windows, the warps 16 and the fills 17 of the fiberglass rovings 13 interwoven with the grid may be bonded at their junctions or crossing points by appropriate means. Furthermore, every two adjacent fiberglass rovings may be interwoven with the grid or net 12.

What is claimed is:

1. A moldable supporting element, for use in bodies formed of a molding resin, said element comprising, in combination, a shape-defining, flexible and inherently dimensionally stable grid structure constituted by a plurality of laterally spaced substantially parallel first metal rods and a plurality of laterally spaced substantially parallel second metal rods overlying and extending transversely of said first metal rods to define, with said first metal rods, a plurality of lattice-windows, the first and second metal rods being bonded to each other at the intersections of said grid structure; and glassfibers rovings, arranged as warps and fills extending across said grid structure and intersecting in each lattice-window, with said warps extending in generally parallel relationship with said second rods and passing over said fills and under said first rods and said fills extending in generally parallel relationship with said first rods and passing under said warps and over said second rods.

2. A moldable supporting element, as set forth in claim 1, including means bonding said warps and fills to each other at their locations of intersection within the lattice windows.

3. A moldable supporting element, as set forth in claim 2, characterized therein that a fiberglass mat is provided on at least one side of said grid structure and said glassfibers rovings interwoven therewith.

* * * * *